United States Patent [19]

Ficker

[11] 4,434,264

[45] Feb. 28, 1984

[54] HIGH CLARITY PROPYLENE POLYMER COMPOSITIONS OF IMPROVED IMPACT STRENGTH

[75] Inventor: Harold K. Ficker, Wayne, N.J.

[73] Assignee: El Paso Polyolefins Company, Paramus, N.J.

[21] Appl. No.: 477,703

[22] Filed: Mar. 22, 1983

[51] Int. Cl.³ .......................... C08K 5/09; C08L 23/12
[52] U.S. Cl. .................... 524/323; 524/396; 524/528; 525/240
[58] Field of Search ............... 524/396, 528, 323; 525/240

[56] References Cited

U.S. PATENT DOCUMENTS

| | | | |
|---|---|---|---|
| 4,048,409 | 9/1977 | Sugita et al. | 524/396 |
| 4,087,485 | 5/1978 | Huff | 525/240 |
| 4,367,841 | 1/1983 | Mazumdar | 525/240 |
| 4,374,227 | 2/1983 | Michie | 525/240 |

*Primary Examiner*—Lewis T. Jacobs
*Attorney, Agent, or Firm*—Fred S. Valles; Margareta Le Maire

[57] ABSTRACT

High clarity propylene polymer compositions having improved impact strength are comprised of a blend of a random copolymer of propylene and ethylene, containing from about 1 to about 6 wt % polymerized ethylene, with a linear low density polyethylene in a weight ratio range between about 80:20 and about 95:5. The linear low density polyethylene is a copolymer of ethylene and a $C_4$–$C_{18}$ alpha-olefin and has a density in the range from about 0.910 to about 0.935 gms/cc.

9 Claims, No Drawings

HIGH CLARITY PROPYLENE POLYMER COMPOSITIONS OF IMPROVED IMPACT STRENGTH

BACKGROUND OF THE INVENTION

Random copolymer polypropylenes are widely used for injection and blow molded packaging applications. These polypropylenes are prepared by copolymerizing propylene with a relatively small amount of ethylene, typically less than 5 wt % based on the total polymer weight. The products have much improved clarity compared to propylene homopolymer and the impact strength is somewhat better than that of the homopolymer. However, the latter property, especially at low temperatures, is not sufficiently high for many applications where the finished articles of manufacture are to be exposed to low temperatures. The impact strength can be improved by addition of rubbery materials such as amorphous ethylene-propylene rubber polymers or ethylene-propylene block copolymers. Also, blends of one or more of the above components with polyethylene have been disclosed in the art as a further means of improving the impact strength especially at low temperatures. Although there has been reported favorable results in attaining the desired improvement in impact strength by these blending techniques, they have always been accompanied by a detrimental reduction in desired clarity which precludes the use of the resin blend in many applications.

It is, therefore, an object of the present invention to provide a high impact propylene polymer composition, having a clarity at least as good or better than that of a random copolymer polypropylene.

THE INVENTION

In accordance with the present invention there is provided a propylene polymer composition comprising
(a) from about 80 to about 95 wt % of a random copolymer of propylene and ethylene containing from about 1 to about 6 wt % polymerized ethylene, and
(b) from about 5 to about 20 wt % of a linear low density polyethylene copolymer of ethylene and at least one $C_4$–$C_{18}$ alpha olefin, said copolymer having a density in the range from about 0.910 to about 0.935 gm/cc.

The random copolymer component preferably has a melt flow in the range between about 1.0 and about 10 g/10 min. at 230° C. and an ethylene content between about 1.5 and about 4 wt %. Random polymers are available commercially and their preparation need not therefore be discussed.

The linear low density polyethylene component, hereinafter sometimes identified as LLDPE, is a copolymer of ethylene and at least one $C_4$–$C_{18}$ alpha-olefin comonomer. Preferably the alpha-olefin comonomer contains from 4 to 8 carbon atoms per molecule. Examples of especially suitable comonomers are butene-1, pentene-1, hexene-1, 4 methyl-pentene-1, heptene-1, octene-1 and mixtures thereof such as butene-1/hexene-1 and butene-1/octene-1, etc. These LLDPE resins can be produced by any of the recently introduced catalytic processes using vapor, solution or slurry techniques at low to medium pressures or high pressure catalytic polymerization in autoclave or tubular reactors. The resin preferably has a melt index from about 0.5 to about 5 g/10 min. at 190° C. and a density of from about 0.910 to about 0.920. A variety of suitable resins are commercially available within the required density and melt flow ranges. The preferred LLDPE concentration ranges between about 8 and about 20 wt % based on the total weight of the resin components.

Optionally, a third component can be included in the resin blend for further improvement in clarity. Examples of clarifying and/or nucleating agents suitable for this purpose are salts of benzoic acid, e.g., sodium benzoate, dibenzylidene sorbitol and others. Usually the agents are added in quantities between about 0.1 and about 2 wt % based on the total polymer weight.

Various additives can, if desired, be incorporated into the polypropylene resin, such as antioxidants, metal deactivating agents, heat and light stabilizers, dyes, antistatic agents, lubricants and the like.

The resin blend can be processed into molded articles by various techniques such as blow molding and injection molding. The composition is especially suitable for the production of household containers, medicine vials and bottles, laboratory ware and other goods requiring a combination of good clarity and impact strength below ambient temperature.

The following composition examples are provided to illustrate the invention.

EXAMPLES 1 THROUGH 8

The composition of Control Example 1 was a non deashed random copolymer of about 97.4 wt % propylene and 2.6 wt % ethylene. This copolymer was also used as the base component of the binary resin blends of the remaining examples.

In each of Comparative Examples 2 and 3 the second component was a low density homopolymer of ethylene (0.9112 density and 2.2 melt index) in the concentration indicated in the Table.

Similar blends were prepared in Comparative Examples 4 and 5 except that the second component was instead a 0.9125 density ethylene-vinyl acetate copolymer having a melt index of 2.0 and a vinylacetate content of about 1.7 wt %.

The blend of Comparative Example 6 contained a 5 melt flow rate block copolymer of propylene and ethylene having about a 14 wt % postblock of ethylene-propylene copolymer and containing about 5.2 wt % ethylene based on the total weight of the block copolymer.

In Examples 7 and 8 the second blending component was a linear low density polyethylene copolymer of ethylene and butene-1 having a 0.9136 density and a 2.1 melt index.

The Table lists all pertinent data including results from physical tests of molded samples of the respective compositions.

As seen from the Table, the composition of Control Example 1 had a Gardner Impact strength at 0° C. of 5.8 and a clarity of 24%.

Relatively small improvements in impact strength were obtained by blending the base resin with either 5 or 10% low density ethylene homopolymer as in Control Examples 2 and 3, with some apparent attendant sacrifice in clarity. Similar unremarkable results were obtained when ethylene-vinylacetate was used as the blending component (Comparative Examples 4 and 5).

The use of the ethylene-propylene block copolymer as a blending component in Comparative Example 6 greatly improved the impact strength but at an unacceptable trade off in clarity, which dropped to 8%.

TABLE

|  | Control Ex. 1 | Control Ex. 2 | Control Ex. 3 | Control Ex. 4 | Control Ex. 5 | Control Ex. 6 | Ex. 7 | Ex. 8 |
|---|---|---|---|---|---|---|---|---|
| Base Component-wt % | 100 | 95 | 90 | 95 | 90 | 50 | 95 | 90 |
| PE Homopolymer-wt % | — | 5 | 10 | — | — | — | — | — |
| EVA Copolymer-wt % | — | — | — | 5 | 10 | — | — | — |
| Block Copolymer-wt % | — | — | — | — | — | 50 | — | — |
| LLDPE-wt % | — | — | — | — | — | — | 5 | 10 |
| Melt Flow Rate[1] | 8.0 | 8.5 | 8.5 | 7.5 | 8.2 | 5.8 | 8.3 | 7.5 |
| Tensile Break Strength (psi)[2] | 2710 | 2900 | 2630 | 2940 | 2560 | — | 2480 | 2500 |
| Tensile Yield Strength (psi)[2] | 4420 | 4260 | 4060 | 4260 | 4050 | — | 4230 | 4050 |
| Tensile Elong. @ Yield (%)[2] | 11.3 | 11.0 | 10.9 | 11.2 | 11.7 | — | 12.5 | 11.9 |
| Tensile Elong. @ Break (%)[2] | 569 | 808 | 259 | 856 | 748 | — | 485 | 284 |
| Tensile Modulus × $10^5$ (psi)[2] | 1.55 | 1.47 | 1.42 | 1.52 | 1.47 | — | 1.53 | 1.49 |
| Flexural Modulus × $10^5$ (psi)[3] | 1.61 | 1.58 | 1.44 | 1.52 | 1.45 | — | 1.50 | 1.50 |
| HDT @ 66 psi (°C.)[4] | 96.7 | 94.0 | 92.0 | 95.5 | 88.5 | — | 96.0 | 92.0 |
| Rockwell, "R" Hardness[5] | 77.5 | 76.5 | 74.5 | 75.0 | 73.5 | — | 77.3 | 74.0 |
| LTB (50% Failures) (°C.)[6] | +9.0 | +7.5 | +5.5 | 5.5 | +0.5 | — | +3.0 | −1.5 |
| Gardner Impact @ C. (in-lbs)[7] | 5.8 | 7.0 | 10 | 7.8 | 12 | 47 | 12 | 54 |
| Gardner Clarity (%)[8] | 24 | 21 | 20 | 23 | — | 8 | 23 | 30 |

[1]ASTM D1238 Cond L.
[2]ASTM D638
[3]ASTM D790
[4]D648
[5]ASTM D785
[6]ASTM D746
[7]ASTM D3629 Method B, 125 mil plaques
[8]ASTM D1356 12 mil compression molded plaques It was completely unexpected, however, to find that when the blending component was a linear low density polyethylene (LLDPE), great improvements were obtained not only in impact strength, but also in clarity especially when the concentration of the LLDPE component exceeded 5%, e.g., at 10% incorporation as in Example 7.

It is to be understood that many modifications and alterations can be made to the composition without departing from the scope of this invention, which is defined by the specification and appended claims.

What is claimed is:

1. A propylene polymer composition comprising
   (a) from about 80 to about 95 wt % of a random copolymer of propylene and ethylene containing from about 1 to about 6 wt % polymerized ethylene, and
   (b) from about 5 to about 20 wt % of a linear low density polyethylene copolymer of ethylene and at least one $C_4$-$C_{18}$ alpha olefin comonomer, said copolymer having a density in the range from about 0.910 to about 0.935 gm/cc.

2. The composition of claim 1 wherein component (a) has a polymerized ethylene content of from about 1.5 to about 4 wt %.

3. The composition of claim 1 wherein component (a) has a melt flow in the range between about 1.0 and about 10 gm/10 min at 230° C.

4. The composition of claim 1 wherein the comonomer of component (b) is a $C_4$-$C_8$ alpha olefin.

5. The composition of claim 4 wherein the comonomer is butene-1.

6. The composition of claim 1 wherein component (b) has a melt index in the range from about 0.5 to about 5 gm/10 min at 190° C.

7. The composition of claim 1 wherein component (b) is present in amounts ranging between about 8 and about 20 wt % based on the total weight of (a) and (b).

8. The composition of claim 1 containing between about 0.1 and about 2 wt % based on the total weight of (a) and (b) of a third component selected from clarifying or nucleating agents.

9. The composition of claim 8 wherein the third component is a benzoic acid salt or dibenzylidene sorbitol.

* * * * *